R. A. BUCKNER.
COFFEE MAKER.
APPLICATION FILED MAY 9, 1908.
899,099.
Patented Sept. 22, 1908.
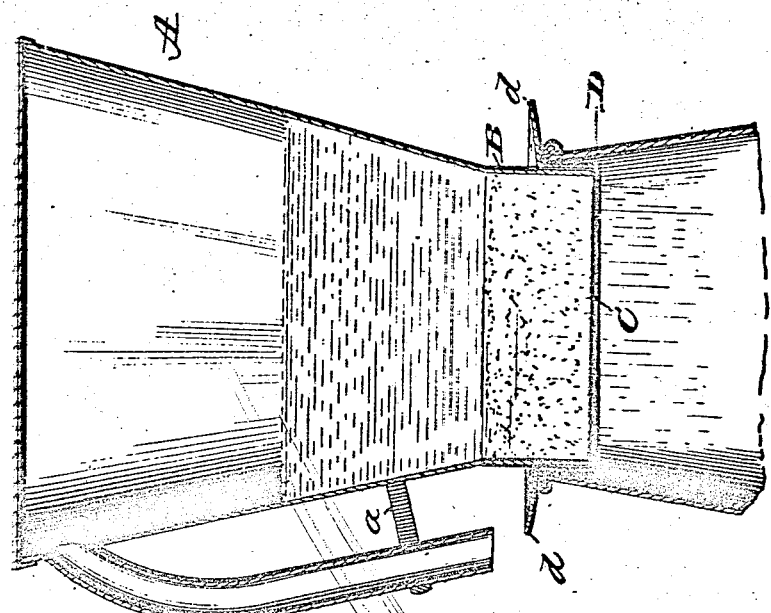
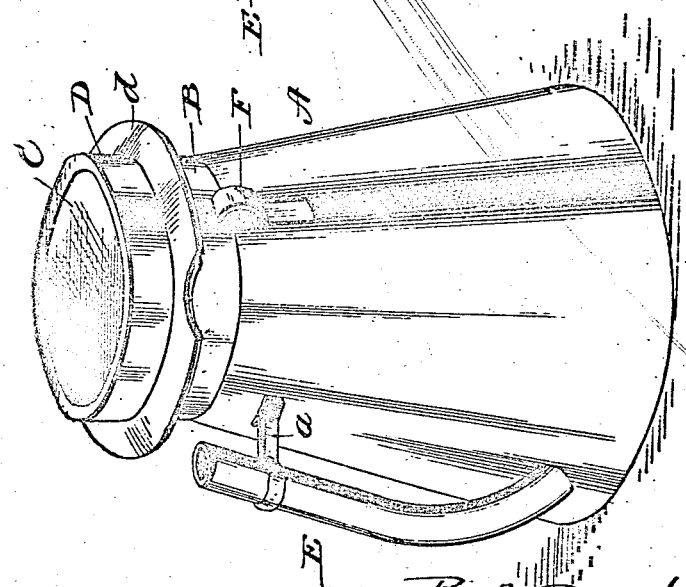

UNITED STATES PATENT OFFICE.

ROYLE A. BUCKNER, OF NEVADA, MISSOURI.

COFFEE-MAKER.

No. 899,099.　　　Specification of Letters Patent.　　Patented Sept. 22, 1908.

Application filed May 9, 1908. Serial No. 431,925.

*To all whom it may concern:*

Be it known that I, ROYLE A. BUCKNER, a citizen of the United States, residing at Nevada, in the county of Vernon and State of Missouri, have invented certain new and useful Improvements in Coffee-Makers, and do hereby declare that the following is a full, clear, and exact description of the same, reference being had to the annexed drawings, making a part of this specification, and to the letters and figures of reference marked thereon.

My invention relates to coffee makers of the type in which the coffee is made by percolation, and my object is to provide a coffee maker by which coffee may be made expeditiously and without loss of or injury to any of the desirable qualities of the coffee, and which will have such construction that it may be easily cleaned.

Referring to the drawings—Figure 1 is a perspective view of a coffee maker constructed in accordance with my invention, in the position in which it is placed preliminary to the percolation of the coffee; and Fig. 2 a vertical section when it is in inverted position for the percolation of coffee into the coffee pot.

In constructing a coffee maker to embody the principle of my invention, I employ a receptacle A in the form of a truncated cone, which at the smaller end has a short cylindrical section B whose open outer end is covered by a strainer C, preferably of cloth, which is secured in position by a binding or clamping cap D in the form of a ring, adapted to be slipped over the upper end of the cylindrical section B and snugly clamp or press the interposed portion of the cloth thereagainst, the ring having at its outer end a narrow inwardly projecting rim or flange, and at its other or inner end an outwardly projecting rim or flange *d*, the surface of said flange *d* towards the body of the receptacle A being dished or concave. Secured to the side of the receptacle A at one end near the larger end of the receptacle, is a piece of pipe or tubing E that from its point of connection with the receptacle, curves gradually outward and then extends towards and reaches nearly to the flange *d* of the cap D, and near its outer end is secured to or braced from the side of the receptacle by means of an arm *a*. Said tube constitutes both an air vent opening from the interior of the receptacle and a handle for the coffee maker. Secured to the outer side of the receptacle near the smaller end thereof, is a partial ring or loop F of a size to admit the forefinger, and located about 120° from the combined vent tube and handle, so that when the forefinger of the left hand is placed in such loop, and the handle is grasped by the right hand with the forefinger above the brace arm *a*, the thumbs of both hands may be applied to the concave side of the flange *d* at diametrically opposite points, and pressure applied thereto by the thumbs to effect the easy and convenient lifting of the cap D when it is desired to remove the latter and the strainer.

Coffee is made by means of my maker as follows: The cap and strainer cloth are removed, and the receptacle standing on its large end has placed within it pulverized coffee and hot water in the proportion of one heaping teaspoonful of coffee to each teacup of boiling water, and then the strainer cloth and cap are replaced. After being allowed to stand one minute, the maker is inverted, being turned upside down by means of the handle, and the strainer end inserted in the open end of a coffee pot as illustrated in Fig. 2, upon which the maker will be supported by means of the cap rim or flange *d*. A portion of the cap rim or flange *d* is cut away to avoid contact or interference with the lid of the coffee pot. The maker is kept in position over the coffee pot until the liquid coffee has percolated through the strainer, and then it is removed. By reason of the large area of the larger end of the receptacle A which constitutes the bottom of the maker in the first stage of making the coffee, a large body of boiling water is immediately effective on the coffee, and this means the rapid and thorough infusion of the coffee in the water, so that all the good qualities of flavor and strength are obtained therefrom before it can be in any wise injured, and by reason of the contracted size of the smaller end of the maker when it is the bottom of the maker, when the latter is in the inverted position illustrated in Fig. 2, the pulverized coffee is so disposed that the water must percolate through it, thus assuring the most thorough extraction of the desirable qualities of the coffee. Any liquid in the tubular handle may run back into the receptacle A. The concave surface of the cap rim or flange *d*, besides affording a good bearing for the thumbs in the operation of removing the cap, constitutes a receptacle or holder for any liquid that may pass thereto when the maker is in position on the coffee pot as shown in Fig. 2, and the liquid is percolating into the coffee pot, and the flange, as I have before stated, supports the maker on the coffee pot.

The strainer may be most easily cleaned and dried and replaced when necessary, its cost being, of course, insignificant.

The curved portion of the vent tube is so easy or slight that it may be easily cleaned by means of a brush or a swab or a flexible wire.

Having thus described my invention, what I claim is—

1. A coffee maker comprising a receptacle, a strainer extending across one end of the receptacle, a strainer-holding ring encircling a portion of the receptacle and having an annular flange, supports on the side of the receptacle for the fingers of the hands, to enable the thumbs to engage said flange, and said flange having a dished or concaved surface that is uppermost when the receptacle is in an inverted position with the strainer constituting its bottom and said flange projecting outward clear of any contiguous surface of the receptacle.

2. A coffee maker comprising a receptacle, a strainer at one end of the receptacle, a vent tube on the outside of the receptacle extending alongside of the same but separated therefrom to enable it to be grasped by the hand, said vent tube communicating with the receptacle at the end opposite the strainer, a brace arm extending from the receptacle to said tube, a finger-engaging loop on the outside of the receptacle, and a removable strainer-clamping ring having an annular flange situated with reference to said loop and said brace arm, so that with the fingers of the hands engaging the same, the thumbs may bear against said flange to remove the ring from the receptacle.

In testimony whereof I affix my signature in presence of two witnesses.

ROYLE A. BUCKNER.

Witnesses:
HERVEY W. HOLTON,
HOMER M. POAGE.